P. M. SCHLAMP.
AUTOMOBILE DIRIGIBLE HEADLIGHT MECHANISM.
APPLICATION FILED OCT. 1, 1921.

1,437,556.

Patented Dec. 5, 1922.
2 SHEETS—SHEET 1.

Inventor
Philip M. Schlamp,
By Watson E. Coleman
Attorney

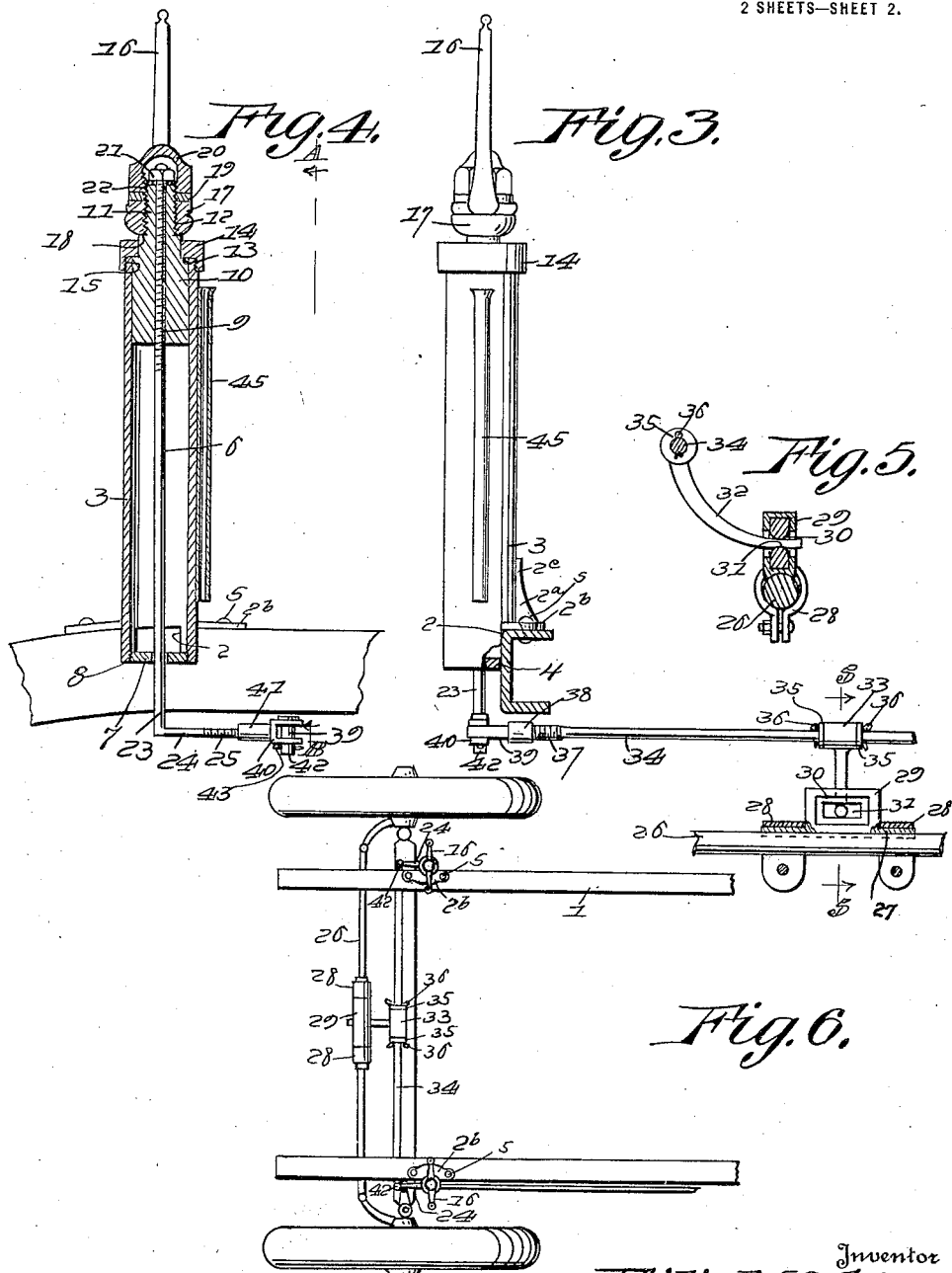

Patented Dec. 5, 1922.

1,437,556

UNITED STATES PATENT OFFICE.

PHILIP M. SCHLAMP, OF HENDERSON, KENTUCKY.

AUTOMOBILE DIRIGIBLE HEADLIGHT MECHANISM.

Application filed October 1, 1921. Serial No. 504,686.

*To all whom it may concern:*

Be it known that I, PHILIP M. SCHLAMP, a citizen of the United States, residing at Henderson, in the county of Henderson and State of Kentucky, have invented certain new and useful Improvements in Automobile Dirigible Headlight Mechanism, of which the following is a specification, reference being had to the accompanying drawings.

It is the purpose of the present invention to provide a mechanism of this character, whereby as the steering wheel of the automobile is rotated for turning the front wheels to the right or the left the headlights of the automobile are correspondingly turned, whereby the light rays from the lamps may follow the course of the front wheels.

Another purpose is the provision of means for supporting the headlights upon the chassis of the automobile, in such wise that the mechanism for steering the headlights may be applied to various makes of motor vehicles, whether the steering knuckle tie rod of the automobile is forwardly or rearwardly of the front axle.

Still another purpose is the provision of a construction, whereby the mechanism may be applied to automobiles generally, regardless as to the width of the chassis, and also to provide means permitting of play in the connections between the steering knuckle tie rod and the headlight connecting rod, in order to accommodate for the vibrations of the steering wheel of the automobile.

While the design and construction at present illustrated and set forth are deemed preferable, it is obvious that as a result of a reduction of the invention to a more practical form for commercial purposes, the invention may be susceptible of changes and the right to these changes is claimed, provided they are comprehended within the scope of what is claimed.

The invention comprises further features and combination of parts, as will be hereinafter set forth, shown in the drawings and claimed.

In the drawings:—

Figure 3 is a view in elevation showing one of the stems 3 mounted upon one side of the chassis which is in section and showing the operative means for the turning rods;

Figure 4 is a vertical sectional view through one of the stems and through a portion of one side of the chassis;

Figure 5 is a detail sectional view of the connection between the control arm and the boxing on the steering knuckle tie rod;

Figure 6 is a plan view of the general parts of the construction of an automobile, showing the headlight mechanism with the steering knuckle tie rod forward of the front axle.

Figure 1:
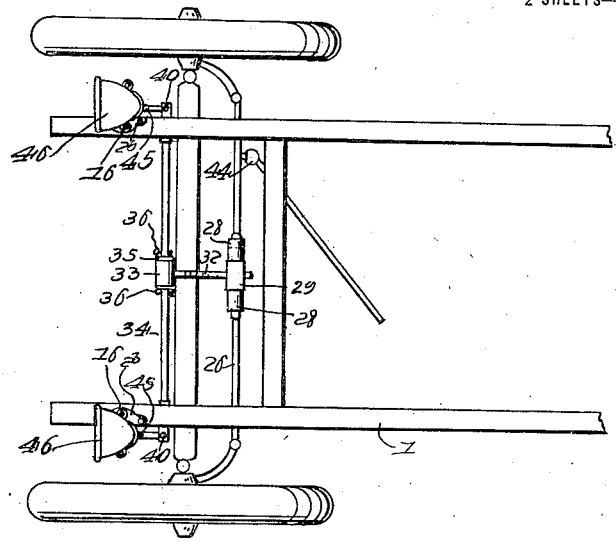
Figure 1 is a plan view of the general construction of an automobile with the chassis disclosed, showing the dirigible headlight mechanism applied.
Figure 2:
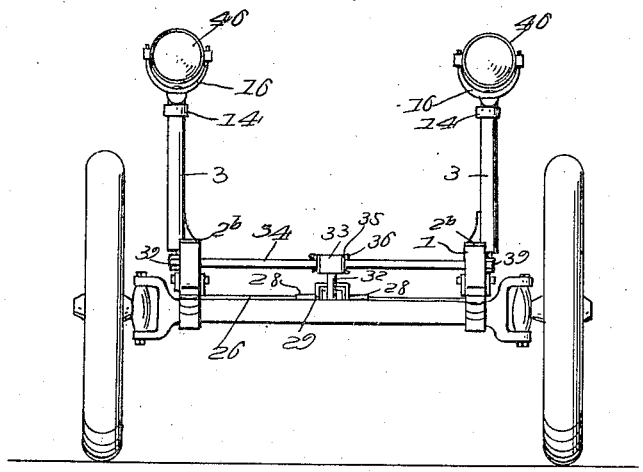
Figure 2 is a view in front elevation of the mechanism applied.
Figure 7:
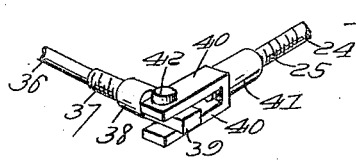
Figure 7 is an enlarged detail perspective view of the connections between one of the coupling sleeves 38 and one of the coupling sleeves 41.

Referring to the drawings, 1 designates the chassis or frame of an automobile, and rising from the opposite sides of the chassis are hollow cylindrical stems 3. The lower portions of the stems 3 are cut away as at 2, and formed integrally with the sides of the stems are bracket supports 2$^a$, which comprise the horizontal portions 2$^b$ and the reinforcing rib 2$^c$. The horizontal portions 2$^b$ are secured to the upper flanges of the opposite sides of the chassis by means of rivets 5. By means of these bracket supports the stems are held perpendicularly in position. However before mounting the stems in place turning or operating rods 6 are mounted in the stems, such turning rods are first engaged through the bottom stem caps 7, which are threaded into the stems as at 8.

The caps 7 are threaded into place before the stems 3 are applied to the chassis. It will be noted that the caps or plates 7 are cut away as shown at 4, and before attaching the stems 3, these plates or caps are turned, so that their straight edges will lie adjacent the side of the chassis, when the stems are attached, and by being so positioned, they are prevented from turning. The caps or plates 7 constitute bearings for turning rods 6, which are rockable, for the purpose of moving the lamps correspondingly to the movement of the front wheels.

For a substantial distance from the upper ends of the turning rods threads 9 are provided, and by which cores 10 are connected to the upper ends of the turning rods, so as to rotate in the stems. These cores have reduced extensions 11, which have threads 12 arranged for a substantial distance thereon. These threads 12 terminate a short distance from the shoulders 13, adjacent where the reduced portions 11 connect with the major portions of the cores. Suitable cap nuts 14 fit over the reduced portions 11 of the cores, so that the non-threaded portions thereof engage through the nuts. The nuts are threaded at 15 to the upper ends of the stems, thereby holding the cores in place, and providing bearings, in which the cores rotate.

The usual headlight forks 16 are threaded upon the reduced portions 11 of the cores, so that the base shoulders 17 of the forks will engage with the shoulders 18, immediately where the threads 12 terminate. Suitable washers 19 engage over the threaded portions 11 and also threaded to the portions are head lock nuts 20, which bear upon and hold the washers 19 in position, so as to lock the headlight forks 16, so as to move or rotate with the cores 10. Threaded upon the upper extremities of the threaded ends of the turning rods 6 are lock nuts 21, between which and the upper extremities of the portions 11, lock washers 22 are interposed, thereby insuring a rigid connection between the rotating or rocking cores and the turning rods. The forks carry the usual headlights, so that when the turning rods rotate correspondingly with the turning of the front wheels of the automobile, the rays of light from the lamps will follow the travel of the front wheels.

The lower end of the turning rods terminate in laterally extending right angle arms 24, which are threaded for a substantial distance as shown at 25. Secured upon the usual steering knuckle tie rod 26 by means of the metal straps 28 is an elongated plate 27, which is semi-circular in cross section. Preferably, but not necessarily, a metal boxing 29 is formed integrally with the plate 27. Molded or vulcanized and secured in any suitable manner in the boxing 29 is a rubber boxing 30, which has an opening 31 for the reception of the control arm 32, which has a barrel 33 at one end. A headlight connecting rod 34 is provided, and passes through the barrel 33, there being washers 35 mounted on the rod 34 to hold the barrel or sleeve 33 in place. Suitable cotter pins 36 pass through the rod 34 in order to hold the washers 35 in position. The opposite ends of the connecting rod 34 are threaded as at 37, and connected thereto are coupling sleeves 38, the flat extensions 39 of which engage between the forks 40 of the coupling sleeves 41, which are connected to the lateral right angle extending arms 24 of the turning rods, by means of the threads 25. Pivot bolts 42 pass through the forks 40 and through the flat extensions 39, and have laterally extending cotter pins 43, for the purpose of holding the bolts in position.

The usual steering wheel of the automobile is connected to the steering knuckle tie rod in the usual manner as indicated at 44. Obviously when the steering wheel of the automobile is turned in one direction or the other, the shaft therefrom and extending through the column, transmits motion through the steering knuckle tie rod or wheel spindle connecting rod, through the connections 44, so that the rod 26 may be shifted to one side or the other, for turning the front wheels of the motor vehicle. Since the rod 26 is connected to the connecting rod 34 of the control arm 32, rocking movements are imparted to the turning rods 6, thereby correspondingly turning the headlights with the front wheels. The control arm 32 has sufficient side play where it engages the boxing 29 of the rod 26, so as to eliminate a continual shaking of the headlights, such as may be transmitted from the irregularities in the road bed to the front wheels of the automobile. The threads at the top of the turning rods, permit the rods to be lengthened or shortened, so as to accommodate them to automobiles of different makes. The coupling sleeves 41 are adjustable, so as to lengthen or shorten the connections between the turning rods and the connecting rod 34, to correspond with the length of the arms on the spindle knuckles of the front wheels, so that the headlights may turn correspondingly to the movements of the front wheels. In other words this adjustment is necessary in order that the headlights will turn at the same ratio as the front wheels. After the length of the turning rods have been determined, so as to accommodate the rods to the particular make of automobile, the turning rods may be cut off at their upper ends. Furthermore when the steering knuckle tie rod is arranged in the front of the axle, instead of at the rear, the mechanism may be reversed, as shown in the drawing (Fig. 6). The barrel or sleeve 33 of the control arm works freely on the headlight connecting rod in order to offset the up and down movement of the chassis relatively to the axle of the wheels. Also the control arm is arcuate in shape to accommodate for the up and down movement of the chassis. The headlight connecting rod is threaded at both ends, so as to adjustably carry the coupling sleeves 38, so that the headlight connecting rod may be adjusted to various widths of chassis of various makes of automobiles.

Carried by the tubular spindles 3 are tubes 45, for the reception of the wires (not shown) which pass or extend to the headlights 46.

The invention having been set forth, what is claimed as being new and useful is:

1. In combination, a pair of vehicle headlights, a pair of tubular stems supported in vertical position upon the sides of the forward ends of the chassis, cores mounted for rocking movements in the upper ends of the stems and provided with extensions, means on the upper ends of the stems to retain the cores rockably therein and through which the extensions pass, forks supporting said headlights and provided with bases adjustably fastened on the extensions and cooperating with said means to support and prevent downward movement of said cores, turning rods passing through the stems and operatively fixed to the cores at their upper ends and means connecting the front wheels and the turning rods for operating the headlights correspondingly with the wheels.

2. In a dirigible headlight mechanism, stems supported upon the sides of the forward ends of the chassis, turning rods passing through the stems and provided at their lower ends with lateral arms, a core rotatably fitting into the upper end of each stem and through which a turning rod adjustably passes, for regulating the lateral arm with respect to the side of the chassis, whereby the arm may swing thereunder, holding means connected to the upper ends of the stems and preventing any possible upward movement of the cores, headlight supporting means adjustable on the cores and cooperating with the holding means to prevent any possible downward movement of the cores, means for locking the turning rods to the cores, and means connecting the front wheels and said arms for turning the headlights.

3. In a dirigible headlight mechanism, vertical stems provided with means at their lower portions overlying and secured to the side rails of the chassis for supporting the stems adjacent to the outer faces of the forward ends of said rails, turning rods passing through the stems and provided at their lower ends with lateral arms located a substantial distance above the forward springs which connect with the down curved ends of the sides of the chassis, headlight supporting means rotatably mounted in the upper ends of the stems and adjustably connecting with the turning rods for adjusting the turning rods to regulate the positions of said lateral arms with respect to the sides of the chassis, whereby the arms may swing under the sides of the chassis without interfering with said springs or the usual apron which is carried by the chassis, and means connecting the automobile front wheels and the lateral arms for turning the headlights.

4. In a dirigible headlight mechanism, vertical stems provided with means at their lower portions overlying and secured to the side rails of the chassis for supporting the stem adjacent to the outer faces of the forward ends of said rails, turning rods passing through the stems and provided at their lower ends with lateral arms located a substantial distance above the forward springs which connect with the down curved ends of the sides of the chassis, a mounting for headlights rotatably fitting within the stems and adjustably fixed to the turning rods for adjusting them to regulate the positions of the arms with respect to the sides of the chassis, whereby they may swing laterally under the chassis without interfering with said springs and the usual apron carried by the chassis, means for preventing any possible upward and downward movement of said mounting, and means connecting the front wheels and said arms for turning the headlights.

5. In a dirigible headlight mechanism, vertical stems provided with means overlying the sides and secured thereto for supporting the stems adjacent to the outer faces of the sides, turning rods passing through the stems, front wheel operating means connecting with the rods, plates secured in the lower ends of the stems and through which the turning rods pass for holding them concentrically rockably therein, the lower portions of the stems and said plates being cut away for the reception of the sides of the chassis to prevent displacement of the stems and detachment of the plates, and headlights at the upper ends of the stems and operatively connected with the turning rods.

6. In a dirigible headlight mechanism, headlight turning rods provided at their lower ends with lateral arms, stems supported on the sides of the forward end of the chassis and receiving said turning rods, a headlight connecting rod, coupling sleeves carried by the ends of the connecting rod and having rectangular extensions, coupling sleeves carried by the arms and provided with spaced apart forks straddling said rectangular extensions, means pivoting the forks to the extensions, said coupling sleeves being adjustable respectively upon the arms and the connecting rod, for regulating the swinging movements of the headlights with respect to the movements of the front wheels, and means connecting the front wheels and said connecting rod.

7. In a dirigible headlight mechanism, headlight turning rods provided at their lower ends with lateral arms, stems supported on the sides of the forward end of the chassis and receiving said turning rods, means for adjusting the turning rods to the stems to regulate the arms with respect to the sides of the chassis, whereby said arms may swing thereunder, a headlight connecting rod, coupling sleeves carried by the ends of the connecting rod and having rectangular extensions, coupling sleeves carried by the arms and provided with spaced apart forks straddling said rectangular extensions, means pivoting the forks to the extensions, said coupling sleeves being adjustable respectively upon the arms and the connecting rod, for regulating the swinging movements of the headlights with respect to the movements of the front wheels, and means connecting the front wheels and said connecting rod.

In testimony whereof I hereunto affix my signature.

PHILIP M. SCHLAMP.